US012536972B2

(12) United States Patent
Lin et al.

(10) Patent No.: US 12,536,972 B2
(45) Date of Patent: Jan. 27, 2026

(54) ELECTRONIC DEVICE WITH ADVANCED IMAGE REFRESHING

(71) Applicant: InnoLux Corporation, Miao-Li County (TW)

(72) Inventors: Shun-Mao Lin, Miao-Li County (TW); Hsing-Yuan Hsu, Miao-Li County (TW); Po-Yang Chen, Miao-Li County (TW); I-An Yao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 69 days.

(21) Appl. No.: 18/425,194

(22) Filed: Jan. 29, 2024

(65) Prior Publication Data

US 2024/0304160 A1 Sep. 12, 2024

Related U.S. Application Data

(60) Provisional application No. 63/488,986, filed on Mar. 8, 2023.

(30) Foreign Application Priority Data

Sep. 28, 2023 (CN) ......................... 202311272263.3

(51) Int. Cl.
*G09G 3/36* (2006.01)

(52) U.S. Cl.
CPC ......... *G09G 3/3677* (2013.01); *G09G 3/3618* (2013.01); *G09G 2310/0208* (2013.01)

(58) Field of Classification Search
CPC ............... G09G 3/3677; G09G 3/3618; G09G 2310/0208
See application file for complete search history.

(56) References Cited

U.S. PATENT DOCUMENTS

| | | | | |
|---|---|---|---|---|
| 7,119,771 | B2 * | 10/2006 | Yoneda | G09G 3/3629 345/204 |
| 2008/0316158 | A1 * | 12/2008 | Chang | G09G 3/3648 345/92 |
| 2009/0179875 | A1 * | 7/2009 | Li | G09G 3/3677 345/204 |
| 2015/0356925 | A1 * | 12/2015 | Lee | G09G 3/3266 345/212 |

FOREIGN PATENT DOCUMENTS

CN 101213485 A 7/2008

* cited by examiner

*Primary Examiner* — Peter D Mcloone
(74) *Attorney, Agent, or Firm* — McClure, Qualey & Rodack, LLP

(57) ABSTRACT

An electronic device with a plurality of panels is provided. The electronic device also has a plurality of scan line driving circuits that correspond to the panels in order to drive the panels. The electronic device also has a controller that is configured to control the scan line driving circuits. Each panel includes a plurality of scan lines. Prior to image refreshing, the controller controls the scan line driving circuits to reset the panels. The controller performs image refreshing by controlling each scan line driving circuit to scan the scan lines of its corresponding panel in a jumping mode scanning procedure.

10 Claims, 11 Drawing Sheets

ELECTRONIC DEVICE WITH ADVANCED IMAGE REFRESHING

CROSS REFERENCE TO RELATED APPLICATIONS

This application claims the benefit of U.S. Provisional Application No. 63/488,986, filed Mar. 8, 2023, and this Application claims priority of China Patent Application No. 202311272263.3, filed on Sep. 28, 2023, the entirety of which is incorporated by reference herein.

BACKGROUND OF THE INVENTION

Field of the Invention

The present disclosure relates to image refreshing of a display of an electronic device.

Description of the Related Art

Nowadays, a variety of electronic devices are equipped with a display. To save energy, electronic devices should have low power consumption. For example, reflective displays and semi-transflective displays are solutions to the question of how to reduce power consumption. When such electronic devices perform image refreshing with conventional scanning (which involves scanning along a particular direction, row by row), visible lines may flash on the display. This can negatively affect the user's visual experience. How to refresh the display screen with a better visual experience is an important issue in this technical field.

BRIEF SUMMARY OF THE INVENTION

An electronic device in accordance with an exemplary embodiment of the disclosure has a plurality of panels, a plurality of scan line driving circuits corresponding to the panels to drive the panels, and a controller configured to control the scan line driving circuits. Each panel includes a plurality of scan lines. Prior to image refreshing, the controller controls the scan line driving circuits to reset the panels. The controller performs image refreshing by controlling each scan line driving circuit to scan the scan lines of its corresponding panel in a jumping mode scanning procedure.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein:

FIG. 6B are waveforms illustrating the scanning scheme of the panel depicted in

FIG. 6A;

DETAILED DESCRIPTION OF THE INVENTION

Figure 1:
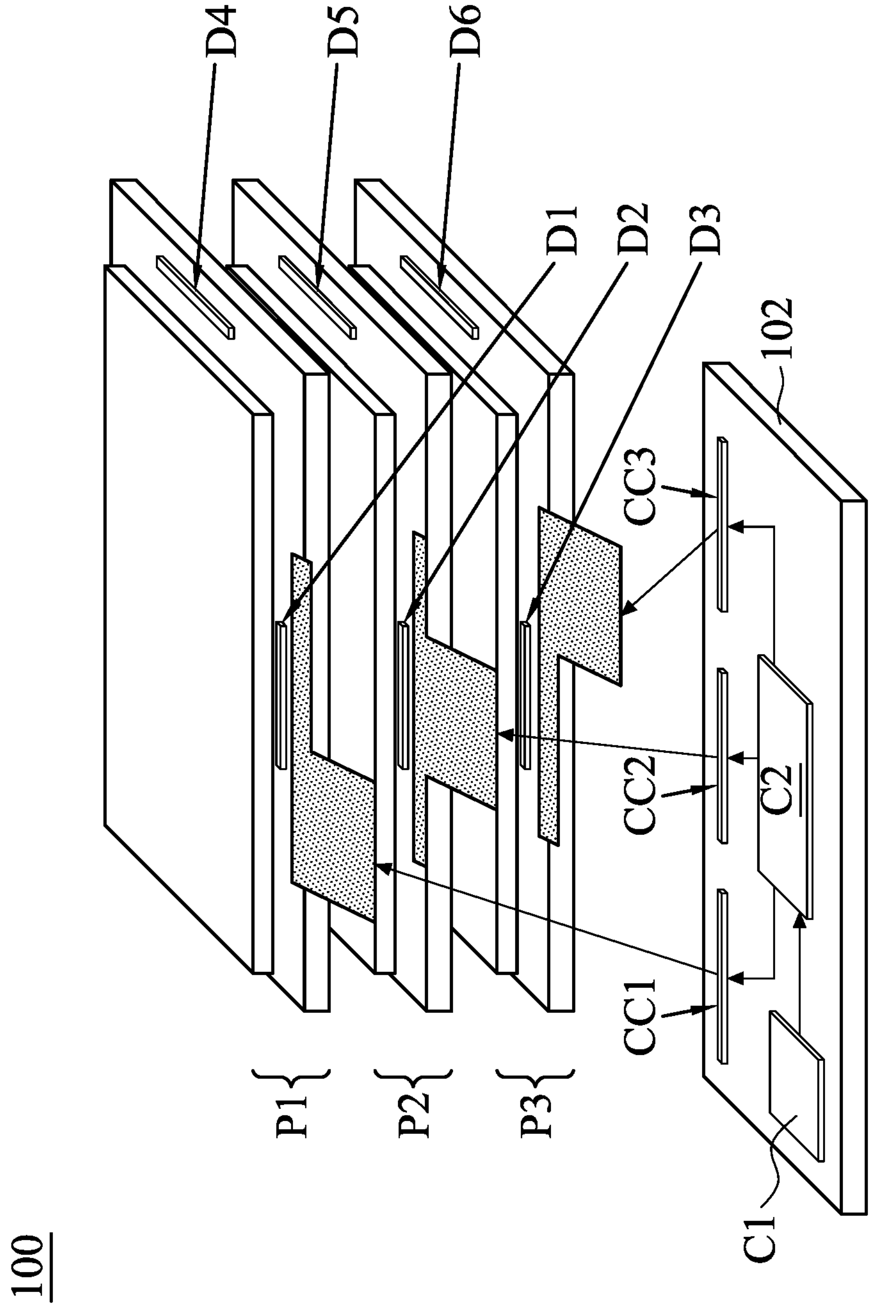
FIG. 1 shows an electronic device 100 in accordance with an exemplary embodiment of the present disclosure.

The following description lists various embodiments of this disclosure to introduce the basic concepts of this case, and is not intended to limit the content of this case. The actual scope of the invention should be defined according to the scope of the patent application. Reference will now be made in detail to exemplary embodiments of the present disclosure, examples of which are illustrated in the accompanying drawings. Whenever possible, the same reference numbers are used in the drawings and descriptions to refer to the same or similar parts.

Throughout this disclosure and the appended claims, certain words are used to refer to specific components. Those skilled in the art will appreciate that the device manufacturers may refer to the same components by different names. This article is not intended to differentiate between components that have the same functionality but different names. In the following description and claims, the words "comprise", "include" and "contain" are open-ended words, and therefore they should be interpreted to mean "comprising but not limited to . . . ."

The directional terms mentioned in this article, such as: "up", "down", "front", "back", "left", "right", etc., are only for reference to the directions of the accompanying drawings. The directional terms in this paper are used to define the relative positions of the illustrated components, and are not intended to limit the disclosure. In the drawings, each figure illustrates the general features of methods, structures, and/or materials used in particular embodiments. However, these drawings should not be interpreted as defining or limiting the scope or nature encompassed by these embodiments. For example, the relative sizes, thicknesses, and locations of the different layers, regions, and/or structures may be shrunken or enlarged for clarity.

In this paper, one structure (or layer, or component, or substrate) located on/above another structure (or layer, or component, or substrate) may mean that the two structures are directly connected, or the two structures are adjacent but not directly connected. Indirect connection means that there is at least one intermediary structure (or intermediary layer, intermediary component, intermediary substrate, intermediary spacer) between two structures. The lower surface of upper structure is adjacent to or directly connected to the upper surface of the intermediary structure. The upper surface of the lower structure is adjacent to or directly connected to the lower surface of the intermediate structure. The intermediary structure may be a single-layer/multi-layer physical structure, or a non-physical structure (there is no limit). In this disclosure, when a structure is disposed "on" another structure, it may mean that the structure is "directly" on the other structure, or that the structure is "indirectly" on the other structure (that is, between the two structures, at least one other structure is also sandwiched).

The terms "about", "equal to", "the same", "substantially" or "roughly" are generally interpreted to mean an offset within 20% of a given value or range, or to mean an offset within 10%, 5%, 3%, 2%, 1% or 0.5% of a given value or range.

Furthermore, any two numerical values or directions used for comparison may have certain errors. If the first value is equal to the second value, it implies that there may be a tolerable error difference about 10%. If a first direction is perpendicular or approximately perpendicular to a second direction, the angle between the first direction and the second direction may be 80~100 degrees. If the first direction is parallel or substantially parallel to the second direction, the angle between the first direction and the second direction may be 0~10 degrees.

The ordinal numbers used in the description and claims, such as "first", "second", etc., are used for identification between components. They do not imply the existence of a component with the previous ordinal number. Such ordinal numbers do not represent the order of the components, or the order of manufacturing procedures. These ordinal numbers are used to clearly distinguish two components with the same naming. The ordinal numbers given to the components in the claims may be different from the ordinal numbers given to the components in the description. Accordingly, the first component in the description may be the second component in the claim.

In the disclosure, descriptions like "a given range is from a first value to a second value" or "a given range falls within the range between a first value and a second value" indicate that the given range includes the first value, the second value, and other values between them.

It should be understood that in the exemplary embodiments of the disclosure, the depth, thickness, width, or height of each component, or the spacing or distance between components may be measured by an optical microscope (OM), a scanning electron microscope (SEM), a film thickness measurement device ($\alpha$-step), or an ellipsometer. In some exemplary embodiments, a cross-sectional structural image of a component may be captured by a scanning electron microscope, which also measures the depth, thickness, width or height of each component, or the spacing or distance between components.

An electronic device may include an imaging device, a laminated device, a display device, a backlight device, an antenna device, an assembled device, a touch display, a curved display, or a free shape display, but not limited thereto. The electronic device may use display media like liquid crystal, light-emitting diodes, fluorescence, phosphor, or any other suitable display media, or a combination of the above, but it is not limited thereto. A display device may be a non-self-luminous display device or a self-luminous display device. An antenna device may be a liquid-crystal type antenna device or a non-liquid-crystal type antenna device. A sensing device may use sensors sensing capacitance, light, heat energy or ultrasonic waves, but it is not limited thereto. An assembled device may be an assembled display device or an assembled antenna device, but it is not limited thereto. It should be noted that the electronic device can be any combination of the above, but it is not limited thereto. The electronic device may be a bendable or flexible electronic device. It should be noted that the electronic device can be any combination of the above, but it is not limited thereto. In addition, the shape of the electronic device may be a rectangular shape, a circular shape, a polygonal shape, a shape with curved edges, or other suitable shapes. The electronic device may have peripheral systems such as a driving system, a control system, a light source system, a structural system, etc., to form the display device, antenna device or assembled device.

It should be noted that in the embodiments shown below, features in several different embodiments may be replaced, reorganized, or combined without departing from the spirit of the present disclosure. Features in various embodiments may be combined as long as they do not violate the spirit of the disclosure or conflict with each other.

Unless otherwise defined, all terms (including technical and scientific terms) used herein have the same meaning as commonly understood by one of ordinary skill in the art. It is understood that these terms, such as those defined in commonly used dictionaries, should be interpreted to have a meaning consistent with the relevant technology and the background or context of the present disclosure, and should not be interpreted in an idealized or overly formal manner (unless otherwise defined).

In addition, the word "adjacent" in the description and claims, for example, is used to describe mutual proximity and does not necessarily mean that they are in contact with each other.

In addition, descriptions such as "when . . . " or "at the moment" in this disclosure means a period of time, from prior to the event to later than the event. It is not limited to events happen just at the same time, which are announced in advance here. Furthermore, "disposed on" and other similar descriptions in this disclosure indicate the relative positions of objects, and do not limit to a physical contact between the objects, unless there are special limitations. Furthermore, when the present disclosure describe multiple functions, and the word "or" is used in listing the functions, it means that the functions can exist independently, but it does not exclude that multiple functions may exist at the same time.

In addition, words such as "electrically connected" or "coupled" in the description and claims not only refer to a direct electrical connection between the different objects, but also refer to an indirect electrical connection between the different objects. Electrical connection includes direct electrical connection, indirect electrical connection, or wireless communication between the different objects.

In this present disclosure, when "or" is used as a connective word between multiple elements, unless otherwise stated, the expressions of "and" and "or" are included.

In the present disclosure, when a certain element is disposed on another element, it means that the certain element may be disposed on a certain side of another element, such as but not limited to above, below, left, right, front, or back side. The two elements may not directly contact to each other.

FIG. 1 shows an electronic device 100 in accordance with an exemplary embodiment of the present disclosure. In this example, the electronic device 100 has an image display function. The electronic device 100 includes a circuit board 102 (such as a system board) and a plurality of panels, such as panel P1, panel P2 and panel P3, but it is not limited thereto, and the number of panels can be the other number depends on the user's requirements. In an exemplary embodiment, panel P1, panel P2 and panel P3 are display panels that reflect light of different colors. For example, panel P1 reflects blue light B, panel P2 reflects green light G, and panel P2 reflects red light R. The illustrated arrangement of panel P1, panel P2 and panel P3 is only an example and can be changed, depending upon the specific requirements. There are attachment mechanisms between the panels P1, P2 and P3 to adhere the panels P1, P2 and P3.

In an exemplary embodiment, the circuit board 102 includes a control element C1 (such as a micro control unit MCU, but not limited thereto) and a control element C2 (such as a timing controller T-con, but not limited thereto). In an exemplary embodiment, the circuit board 102 is electrically connected to the different panels (panel P1, panel P2 and panel P3) respectively through the different ports (CC1, CC2 and CC3), but it is not limited thereto. Panels P1, P2 and P3 each include, for example, a scan line driving circuit (D1/D2/D3) and a data driving circuit (D4/D5/D6). The panels P1, P2, and P3 each include multiple scan lines (see subsequent figures). The control element C1 (such as the micro control unit MCU) on the circuit board 102 may operate the control element C2 (timing controller T-con) to drive the scan line driving circuits D1, D2 and D3 of the panels P1, P2 and P3 to display image.

In this case, prior to the image refreshing, the controller (including the control element C1 and the control element C2) controls the scan line driving circuits (such as the scan line driving circuits D1, D2 and D3) to reset the panels (such as panels P1, P2 and P3), so that the liquid-crystal layers (such as cholesteric liquid-crystal layers, not shown) in these panels can be switched to a homeotropic state first, and then to a planar state to respectively reflect different color lights of the different wavelength bands (such as reflecting blue light, green light, and red light respectively, but not limited to these colors). After the panel resetting, the colors displayed by the panels may form a white image, but they are not limited thereto.

When the screen is refreshed, the controller (including the control element C1 and the control element C2) controls the scan line driving circuits (such as the scan line driving circuits D1, D2 and D3) to scan their corresponding scan lines in a jumping scanning manner. Through a jumping mode scanning procedure, at least two of the first-scanned scan line, the second-scanned scan line and the third-scanned scan line scanned sequentially on the same panel are not physically adjacent to each other, wherein the non-adjacent scan lines are physically separated from each other by at least one the other scan lines.

According to the above technology, the image refreshing includes, for example, resetting each panel and then performing a jumping mode scanning procedure on each panel, which can optimize the user's visual experience. Compared with the traditional scanning method that on each panel the scanning is performed one line after another line along a single direction, the present disclosure performs a jumping mode scanning procedure on each panel. The scanning, therefore, is invisible. The user's visual experience is optimized.

In the exemplary embodiment, the electronic device 100 includes reflective panels which are implemented by display medium layers (not shown) of cholesteric liquid crystal, electronic ink or other suitable display medium. The refresh speed of this type of reflective panels is relatively long. If the traditional sequential scanning method along a particular direction of the panel is applied to refresh the image, the user can easily observe the refreshed lines. This disclosure proposes to use a jumping mode scanning procedure to refresh the image, which can reduce the above problems.

In an exemplary embodiment, the electronic device 100 may be an e-book, an e-ink tag, an electronic signage, or other suitable reflective panels, etc., but not limited thereto. The electronic device 100 may optionally have a touch panel (not shown) or a light sensing design (not shown), but not limited thereto.

This technology is not limited to applications of reflective panels. In other embodiments (not shown), the electronic device may use other types of display devices (self-luminous display devices, non-self-luminous display devices, transflective display devices, transparent display devices or other suitable display devices). Or, the electronic device may be an antenna device, a sensor, or an assembled device, but not limited to this.

Figure 2:
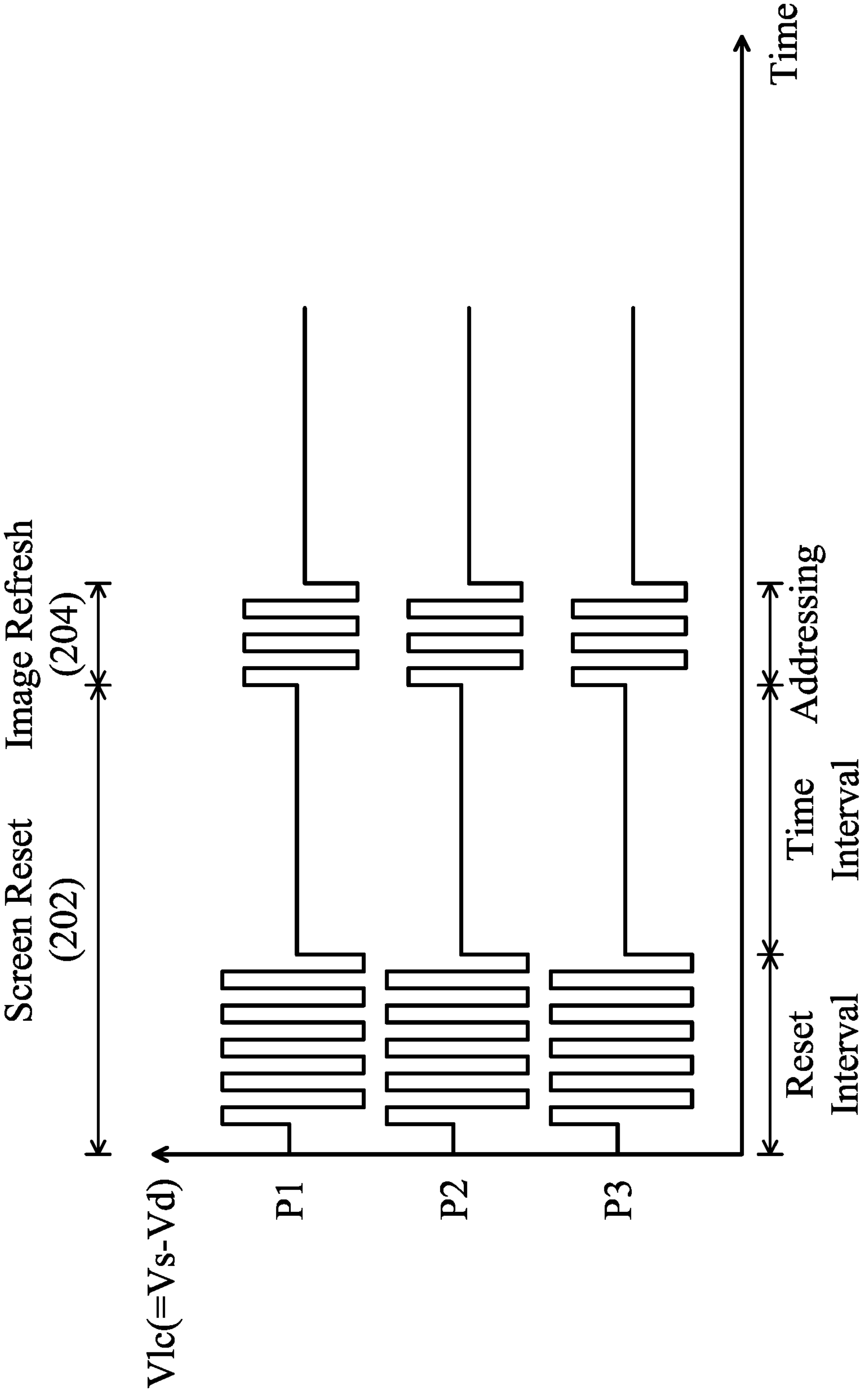
FIG. 2 is a timing diagram illustrating the operation of each panel P1, P2 and P3 in accordance with an exemplary embodiment of the disclosure.

FIG. 2 is a timing diagram illustrating the operation of each panel P1, P2 and P3 in accordance with an exemplary embodiment of the disclosure, in which the cross-voltage Vlc controlling the liquid crystal of the panels at different timings is shown, where Vlc=Vs−Vd, Vs is a scan line voltage, and Vd is a data line voltage. The illustrated example includes two phases: an screen reset phase 202 and an image refresh phase 204, but not limited to this. Some other phases may be inserted between screen reset phase 202 and the image refresh phase 204 according to the design requirements. In this example, the cholesteric liquid crystals of the different panels (P1, P2, and P3) reflect light of different colors. In the screen reset phase 202, the liquid crystals are rotated to a homeotropic state. For example, a large liquid-crystal cross-voltage Vlc is applied to rotate the controlled liquid crystal to the homeotropic state. Then, the liquid-crystal cross-voltage Vlc drops to 0V, the controlled liquid crystals, for example, are rotated to a planar state (but not limited to) and the screen reset phase 202 is finished. Subsequently, the procedure enters the image refresh phase 204 according to the needs. In the image refresh phase 204, there is an addressing period and, accordingly, the scan lines of each panel (P1/P2/P3) are sequentially scanned one line after another to display an image.

Figure 3:
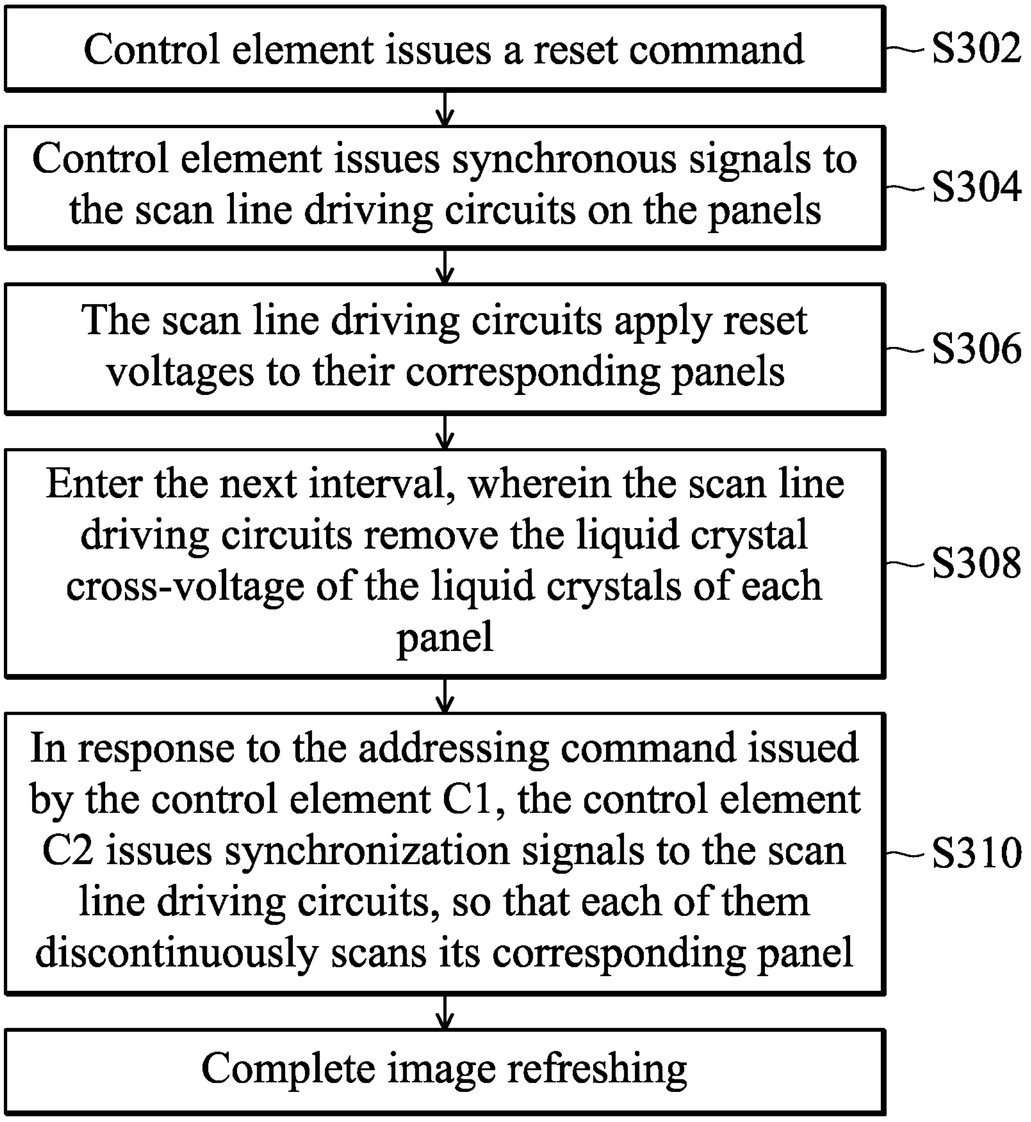
FIG. 3 is a flow chart illustrating panel operations of an electronic device in accordance with an exemplary embodiment of the disclosure.

FIG. 3 is a flow chart illustrating screen reset (202) and image refresh (204) processes performed by the electronic device 100 in accordance with an exemplary embodiment of the disclosure, but not limited thereto. In step S302, the control element C1 on the circuit board 102 issues a command such as a reset command. In response to the reset command, step S304 is performed, the control element C2 (such as a timing controller) on the circuit board 102 issues synchronous signals to the scan line driving circuits D1, D2 and D3 on the panels P1, P2 and P3. In step S306, the scan line driving circuits D1, D2 and D3 apply reset voltages to their corresponding panels P1, P2 and P3 to reset the liquid crystals, so that the liquid-crystal layers in all panels are in a homeotropic state. In step S308, the procedure enter the next interval, wherein the scan line driving circuits D1, D2, and D3 remove the liquid-crystal cross-voltage of the liquid crystals of each panel. For example, the liquid-crystal cross-voltage Vlc is 0. At this time, the liquid-crystal layers in the different panels are all in a planar state, and reflect different colors respectively. In an exemplary embodiment, the panels P1, P2, and P3 respectively include cholesteric liquid crystals that reflect blue, green, and red. When these cholesteric liquid crystals are rotated to the planar state (i.e., a reflective state), they reflect blue, green, and red, respectively. These colors results in a white image. For example (but it is not limited thereto), the white image is presented in the screen reset phase 202 prior to the image refresh phase 204. In step S310, in response to the addressing command issued by the control element C1, the control element C2 issues synchronization signals to the scan line driving circuits D1, D2, and D3, so that each of them discontinuously scans its corresponding panel P1/P2/P3. After the addressing procedure, the image refreshing is completed. In short, to refresh an image, the controller (including the control element C1 and/or the control element C2) operates the scan line driving circuits (such as the scan line driving circuits D1, D2 and D3) to scan the scan lines on their corresponding panels (such as panels P1, P2, and P3) according to the same scanning scheme (such as the same jumping mode scanning procedure).

In another exemplary embodiment, at least two panels of the panels P1, P2, and P3 may adopt the different jumping mode scanning procedures.

Various jumping mode scanning procedures are exemplified below. Regarding the first to $M_{th}$ scan lines that are sequentially scanned in chronological order (M is a number greater than 1), the (M−1)th scan line is not physically adjacent to (M−2)th scan line and/or the $M_{th}$ scan line.

Figure 4A:
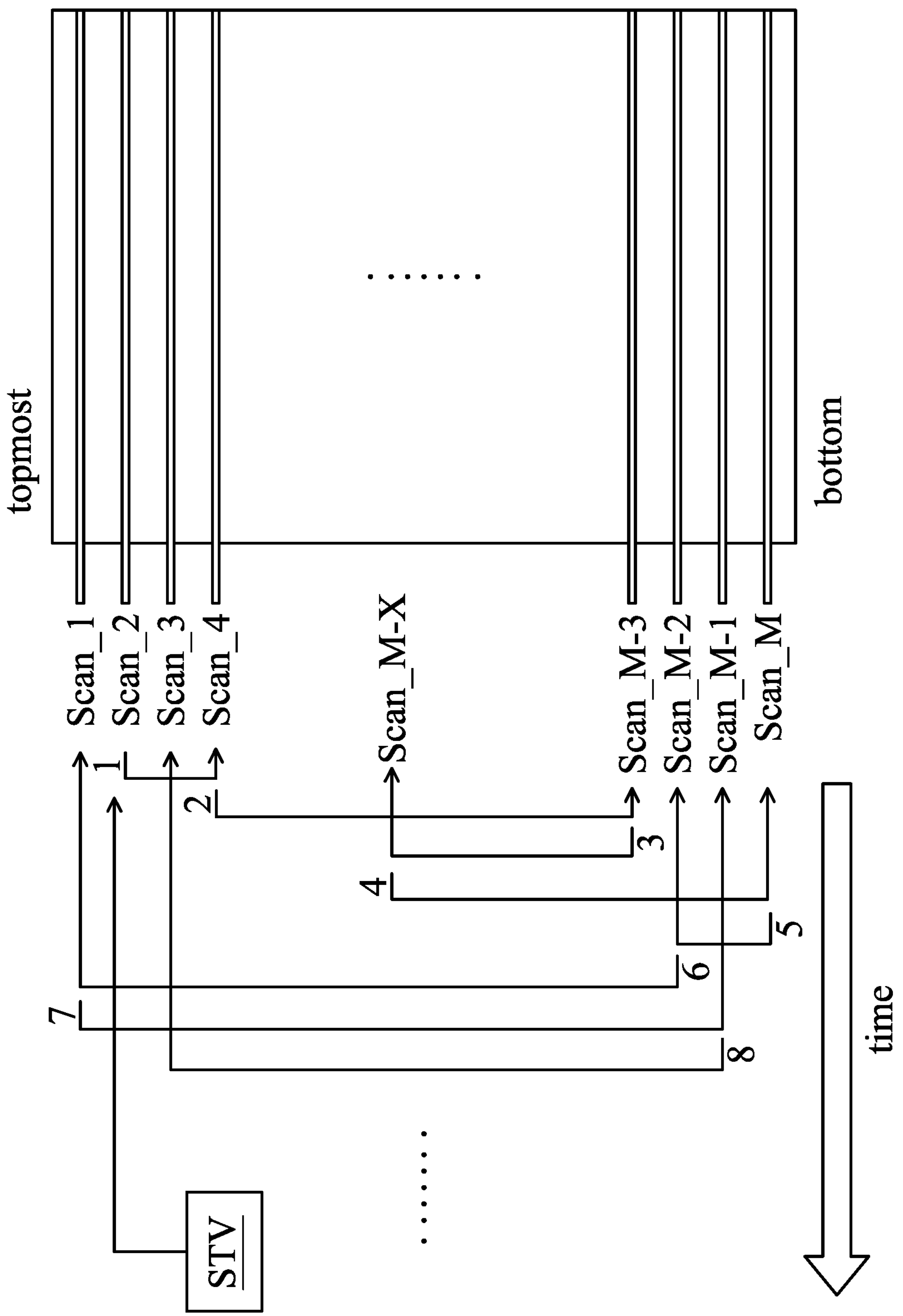
FIG. 4A illustrates a scanning scheme.

FIG. 4A illustrates a scanning scheme that is based on the concept of random scanning. The illustrated scanning scheme may be applied to any of the panels P1, P2 and P3. The image refresh phase 204 follows the screen reset phase 202. In the refresh phase 204, for example, the scanning starts from a randomly selected scan line according to a start pulse vertical signal STV. Referring to the timing tag 1, the scanning starts from the second row of scan line Scan_2, and continues to another scan line that is randomly selected from the unscanned lines. Referring to the timing tag 2, the fourth row of scan line Scan_4 is scanned next to the scanning of Scan_2. The random scanning continuous until all scan lines are scanned (refer to timing tags 3, 4, 5, 6, 7, 8 . . . ). The scan order of the scan lines is only an example and can be modified, depending upon the specific requirements. As the scanning progresses, image data is input row by row, and the liquid crystals are rotated accordingly to complete the image refresh.

Figure 4B:
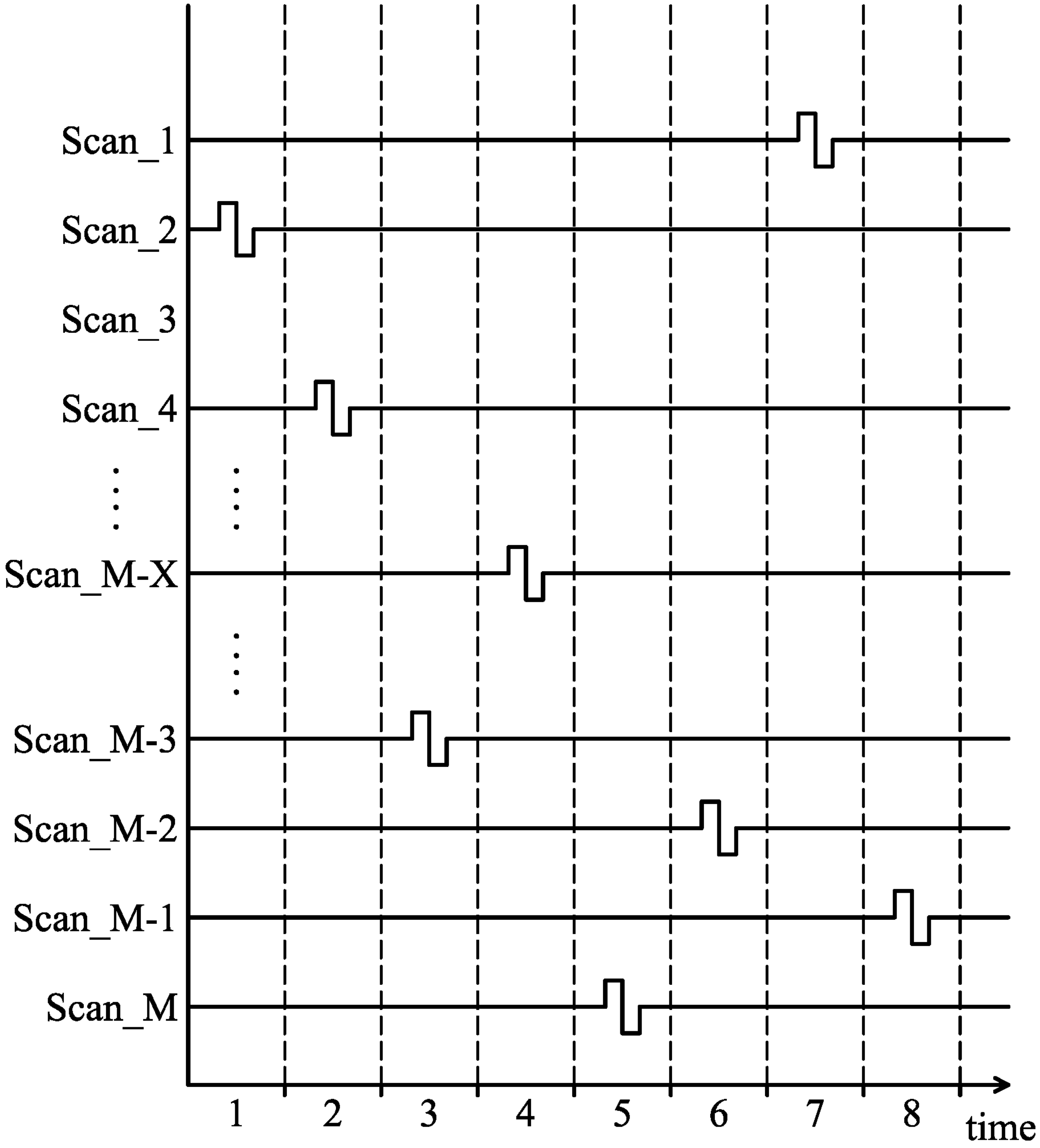
FIG. 4B are waveforms illustrating the scanning scheme of the panel depicted in FIG. 4A.

FIG. 4B are waveforms illustrating the scanning scheme of the panel depicted in FIG. 4A. The scan order is: Scan_2, Scan_4, Scan_M−3, Scan_M−X, Scan_M, Scan_M−2, Scan_1, Scan_M−1, and Scan_3. Both M and X are positive integers, and M is greater than X. According to the aforementioned exemplary embodiment, when refreshing an image, one of the scan line driving circuits scans a first-scanned scan line, a second-scanned scan line, and a third-scanned scan line on its corresponding panel in chronological order. The second-scanned scan line is not physically adjacent to the first-scanned scan line or the third-scanned scan line, but it is not limited thereto. Specifically, in the illustrated panel of FIG. 4A, the first-scanned scan line is the second row of scan line Scan_2, the second-scanned scan line is the fourth row of scan line Scan_4, and the third-scanned scan line is the (M−3)th row of scan line Scan_M−3. The second-scanned scan line Scan_4 is not physically adjacent to the first-scanned scan line Scan_2 or the third-scanned scan line Scan_M−3. In some exemplary embodiments, when the refreshing the image, one of the scan line driving circuits sequentially scans its corresponding panel according to such a scan order: a first-scanned scan line, a second-scanned scan line, and a third-scanned scan line. The second-scanned scan line is not physically adjacent to at least one of the first-scanned scan line and the third-scanned scan line. In this example, the first-scanned scan line is the second row of scan line Scan_2, the second-scanned scan line is the fourth row of scan line Scan_4, and the third-scanned scan line is the $(M-3)_{th}$ row of scan line Scan_M−3. The second-scanned scan line Scan_4 is not physically adjacent to at least one of the first-scanned scan line Scan_2 and the third-scanned scan line Scan_M−3.

In some exemplary embodiments, the number of scan lines spaced between the first-scanned scan line and the second-scanned scan line is different from the number of scan lines spaced between the second-scanned scan line and the third-scanned scan line. Specifically, the number of scan lines spaced between the first-scanned scan line Scan_2 and the second-scanned scan line Scan_4 is 2, that is different from the number of scan lines spaced between the second-scanned scan line Scan_4 and the third-scanned scan line Scan_M−3 (which is M−3−4).

In the above exemplary embodiments, the scan order of scan lines is only an example. In some exemplary embodiments, a panel is scanned by multiple rounds and, in each round, the sequentially scanned scan lines are spaced from each other by a regular number of intermediate scan lines, but not limited to this.

Figure 5A:
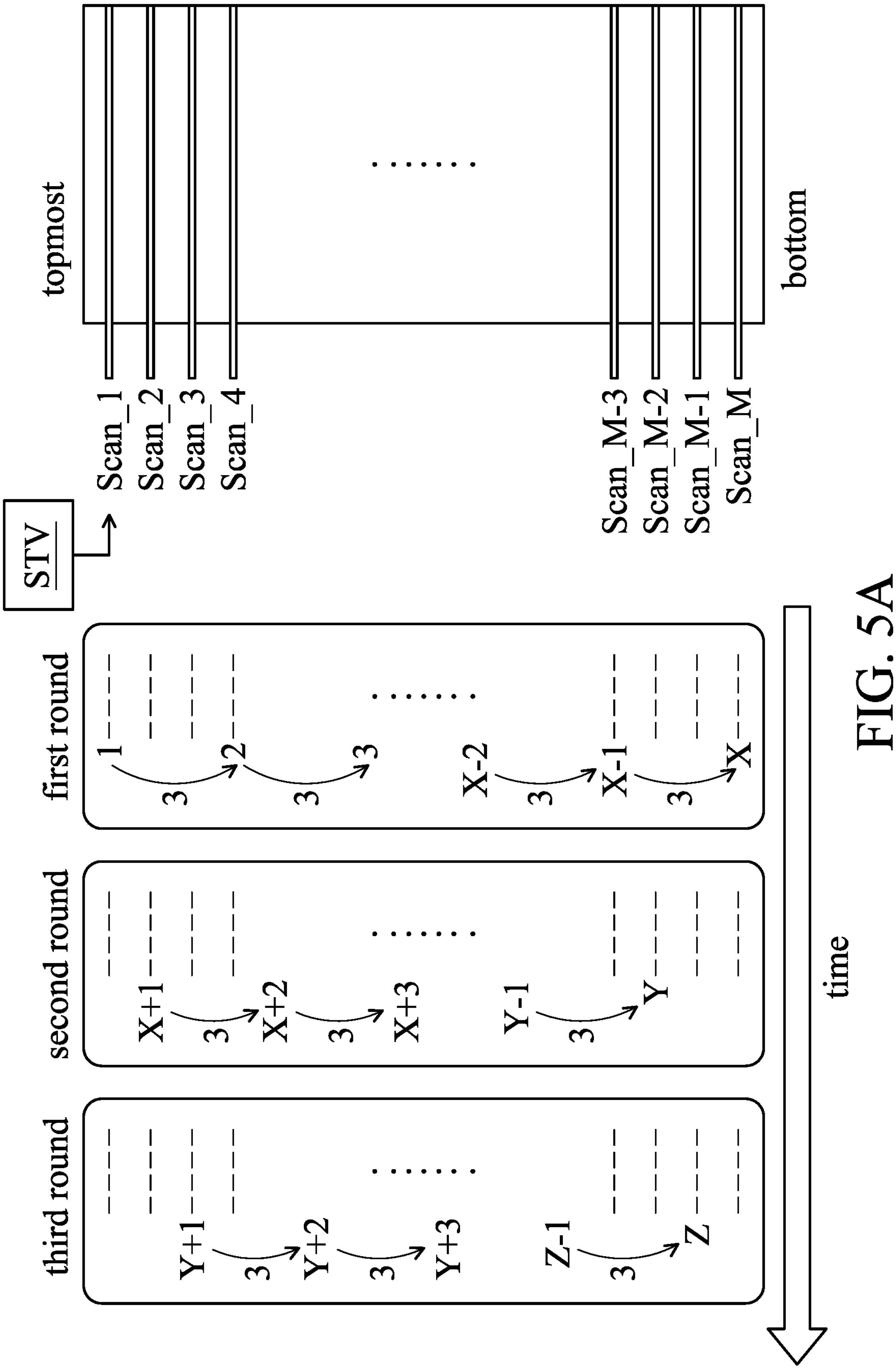
FIG. 5A illustrates another scanning scheme.

FIG. 5A illustrates an example wherein N rounds of scanning is illustrated as an example; e.g., N is 3 but not limited to this. The value N depends on the designer's needs, where N can be any positive integer greater than 2. The panels P1, P2 or P3 can optionally set up to adopt such a scanning scheme. After being reset, the controlled panel performs the first round of scanning to the $N_{th}$ round of scanning in chronological order (N is, for example, 3). In the first round of scanning, the start pulse vertical signal STV first triggers the topmost row of scan line Scan_1 (with a timing tag 1), and then the scanning jumps to scan the fourth row of scan line Scan_4 (with a timing tag 2). The first row of scan line Scan_1 and the fourth row of scan line Scan_4 are physically separated by two scan lines. By adding a fixed number, 3 (=4−1), the next row to be scanned is obtained. Based on the fixed jump amount (for example, adding 3 to get the next row of scan line for scanning, but not limited to this), the panel is scanned from top to bottom (with the timing tag increases from 1 to X), and the first round of scanning is completed. In the first round of scanning, the start pulse vertical signal STV first triggers the top row of scan line Scan_1 (with a timing tag 1), and then the scanning jumps to scan the fourth row of scan line Scan_4 (with a timing tag 2). The first row of scan line Scan_1 and the fourth row of scan line Scan_4 are physically separated by two scan lines. By adding a fixed number, 3 (=4−1), the next row to be scanned is obtained. Based on the fixed jump amount (for example, adding 3 to get the next row of scan line for scanning, but not limited to this), the panel is scanned from top to bottom (with the timing tag increases from 1 to X), and the first round of scanning is completed. In the second round of scanning, the scanning starts from the second row of scan line Scan_2 (with a timing tag X+1), and then the scanning jumps to scan the fifth row of scan line Scan_5 (with a timing tag X+2). The second row of scan line Scan_2 and the fifth row of scan line Scan_5 are physically separated by two scan lines. By adding the same fixed number, 3 (=5−2), the next row to be scanned is obtained. Based on the fixed jump amount (for example, adding 3 to get the next row of scan line for scanning, but not limited to this), the panel is scanned from top to bottom (with the timing tag increases from X+1 to Y), and the second round of scanning is completed. Note that the jumping mode scanning procedure may be adjusted, depending upon the specific requirements. Basically, the three scan lines (the first-scanned scan line, the second-scanned scan line, and the third-scanned scan line) scanned sequentially in chronological order are not three physically adjacent scan lines. It complies with the basic concept, wherein at least two sequentially scanned scan lines are not physical adjacent scan lines. The term "physically adjacent" is described here.

The first row of scan line Scan_1, the second row of scan line Scan_2, and the third row of scan line Scan_3 are physically adjacent scan lines. The second row of scan line Scan_2, the third row of scan line Scan_3, and the fourth row of scan line Scan_4 are physically adjacent scan lines. Based on this concept, physically adjacent scan lines are clearly defined.

In some exemplary embodiment, the second round of scanning may use a jumping mode scanning procedure different from that adopted in the first round of scanning Or, the all rounds of scanning may use the identical jumping mode scanning procedure. In the third round of scanning, the scanning starts from the third row of scan line Scan_3 (with a timing tag Y+1), and then the scanning jumps to scan the sixth row of scan line Scan_6 (with a timing tag Y+2). The third row of scan line Scan_3 and the sixth row of scan line Scan_6 are physically separated by two scan lines. By adding the same fixed number, 3 (=6−3), the next row to be scanned is obtained. Based on the fixed jump amount (for example, adding 3 to get the next row of scan line for scanning, but not limited to this), the panel is scanned from top to bottom (with the timing tag increases from Y+1 to Z), and the third round of scanning is completed.

Figure 5B:
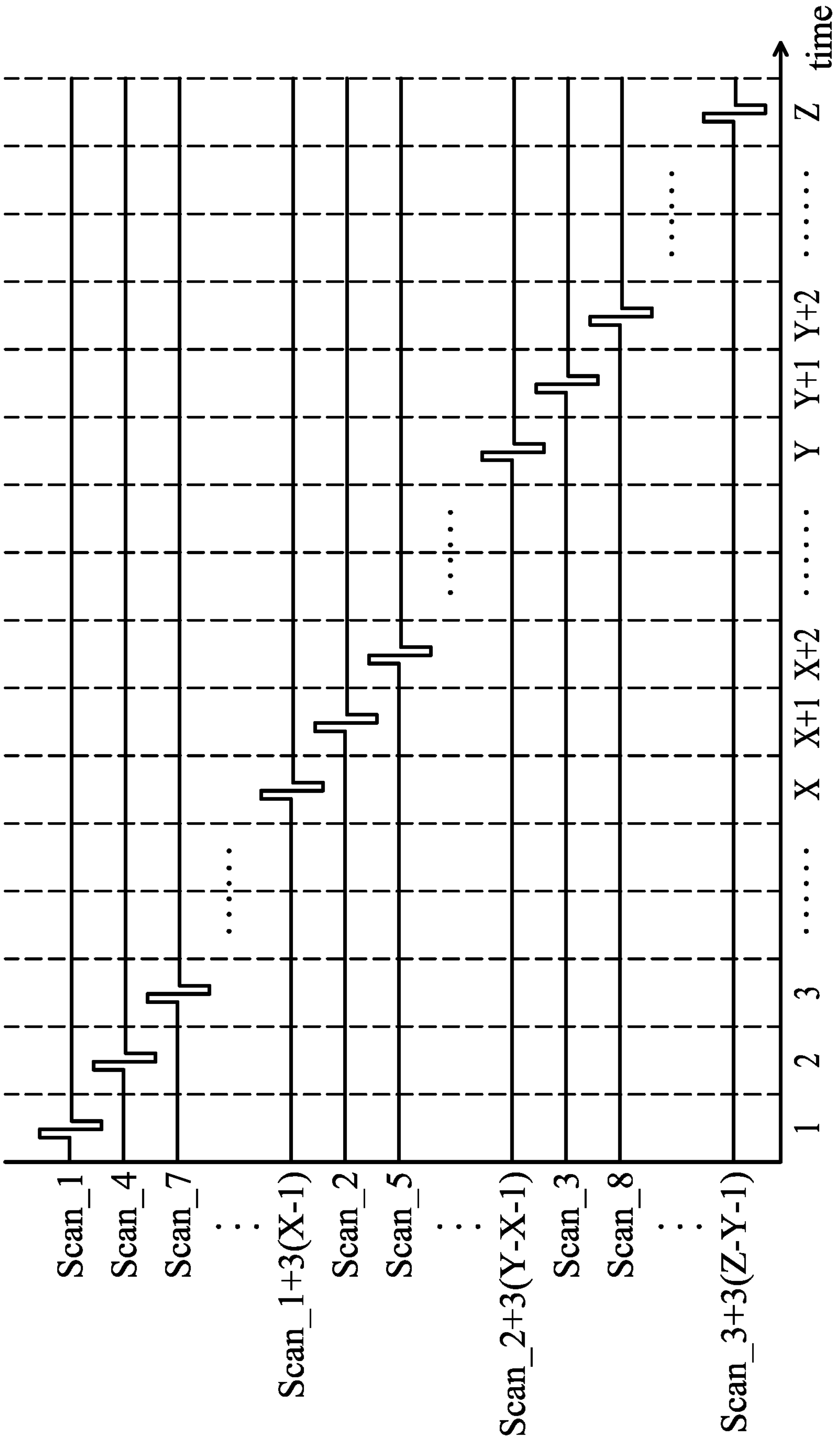
FIG. 5B are waveforms illustrating the scanning scheme of the panel depicted in FIG. 5A.

FIG. 5B is a timing diagram illustrating the panel scanning of FIG. 5A. The first round of scanning corresponds to timing tags 1, 2, . . . , X, and the scanned scan lines are, for example, Scan_1, Scan_4, . . . , Scan_1+3(X−1) in chronological order. The second round of scanning corresponds to timing tags X+1, X+2, . . . , Y, and the scanned scan lines are, for example, Scan_2, Scan_5, . . . , Scan_2+3(Y−X−1) in chronological order. The third round of scanning corresponds to timing tags Y+1, Y+2, . . . , Z, and the scanned scan lines are, for example, Scan_3, Scan_6, . . . , Scan_3+3(Z−Y−1) in chronological order.

In some exemplary embodiments, on a panel, the sequentially scanned scan lines are: a first-scanned scan line, a second-scanned scan line, and a third-scanned scan line. The number of scan lines spaced between the first-scanned scan line and the second-scanned scan line may be the same as the number of scan lines spaced between the second-scanned scan line and the third-scanned scan line. Referring to the example of FIG. 5B, the first-scanned scan line, the second-scanned scan line, and the third-scanned scan line are: the first row of scan line Scan_1, the fourth row of scan line Scan_4, and the seventh row of scan line Scan_7, respectively. The second-scanned scan line Scan_4 is not physically adjacent to the first-scanned scan line Scan_1, and the second-scanned of scan line Scan_4 is neither physically adjacent to the third-scanned scan line Scan_7. However, the number of scan lines spaced between the first-scanned scan line Scan_1 and the second-scanned scan line Scan_4 is the same as the number of scan lines spaced between the second-scanned scan line Scan_4 and the third-scanned scan line Scan_7. The scan lines scanned sequentially in chronological order are not physically adjacent scan lines. Such multiple rounds of regular jumping mode scanning are not limited to starting from the topmost scan line Scan_1 of the panel. The starting scan lines of two consecutive rounds are not limited to physically adjacent scan lines. In another exemplary embodiment, the first round of scanning may start from the third row of scan line Scan_3, and the second round of scanning may start from the first row of scan line Scan_1. The fixed increment N of the serial number of scan line is not limited to 3, and may be any number greater than 1. The illustrated scanning order is only an example and can be modified, depending upon the specific requirements. In the illustrated example, the three scan lines scanned sequentially in chronological order (the first-scanned scan line, the second-scanned scan line, and the third-scanned scan line) are not physically adjacent scan lines. Such a scanning scheme is an example of the proposed jumping mode scanning procedure.

In another embodiment, a panel can be divided into several areas, and the aforementioned random scanning or jumping mode scanning procedures may be implemented separately in each area.

Figure 6A:
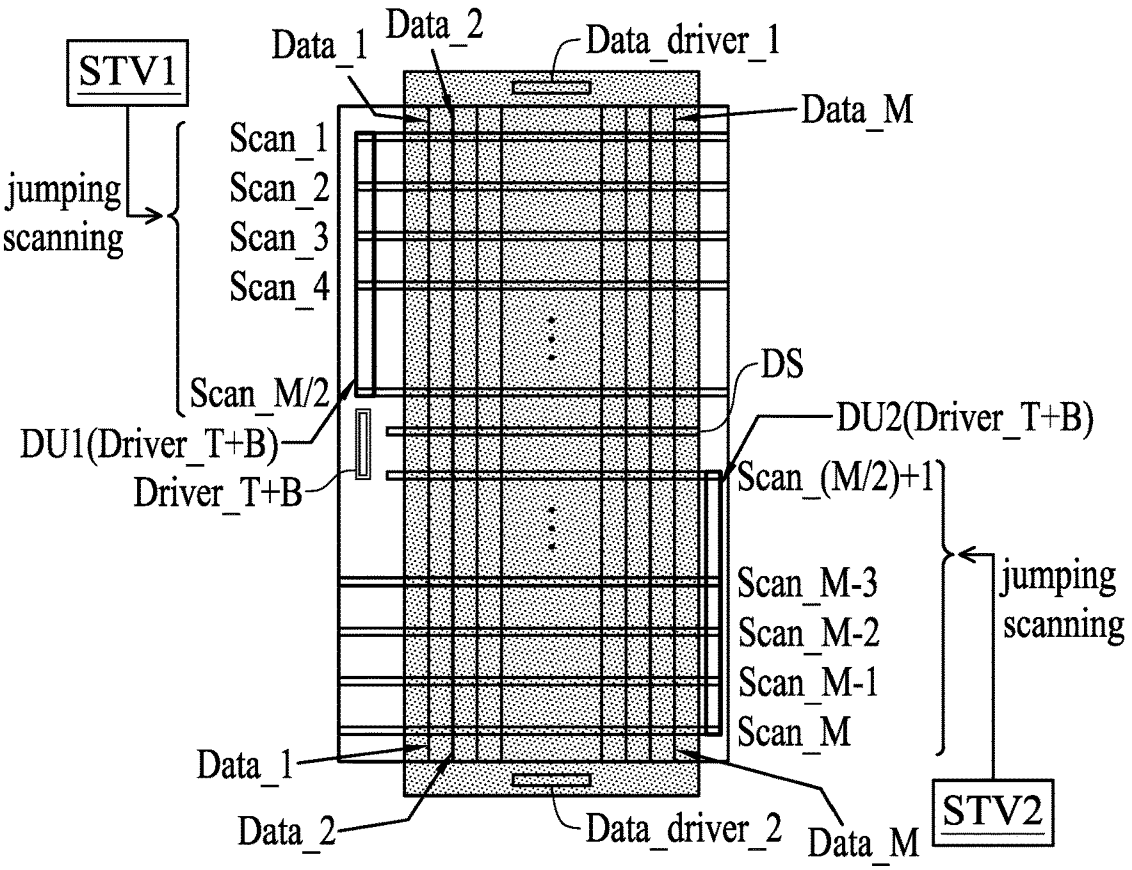
FIG. 6A illustrates a panel design of an electronic device in accordance with an exemplary embodiment of the disclosure.

FIG. 6A illustrates panel operations of an electronic device in accordance with an exemplary embodiment of the disclosure, which includes a circuit separation area DS for dividing the data lines (such as data lines Data_1, Data_2 . . . , Data_M) of the panel into different parts. As shown, the data lines extending from top to bottom (such as data lines Data_1, Data_2 . . . , Data_M) can be divided into a first part (such as the upper half) and a second part (such as the lower half), but they are not limited thereto. In other embodiments, there may be optionally more circuit separation areas DS to divide the data lines into more parts. FIG. 6A illustrates the appearance of one panel (e.g., panel P1), and the other panels (e.g., panel P2 or P3) may have similar implementations. This panel includes a data driving circuit Data_driver 1 and data driving circuit Data_driver 2. For example, the data driving circuit Data_driver 1 is electrically connected to the electronic components scanned by a first part of a plurality of scan lines, and the data driving circuit Data_driver 2 is electrically connected to the electronic components scanned by a second part of the scan lines. Specifically, the data driving circuit Data_driver 1 is electrically connected to electronic components (such as display components, but not limited thereto) scanned by the first part of the scan lines (such as the scan lines Scan_1 to Scan_M/2) Similarly, the data driving circuit Data_driver 2 is electrically connected to electronic components (such as display components, but not limited thereto) scanned by the second part of the scan lines (such as the scan lines Scan_(M/2)+1 to Scan_M). For example, the electronic components electrically connected to the first part of scan lines (scan lines Scan_1 . . . Scan_M/2) are electrically connected to the data driving circuit Data_driver 1 and receive the data signals provided by the data driving circuit Data_driver 1. Similarly, the electronic components electrically connected to the second part of scan lines (scan line Scan_(M/2)+1 . . . Scan_M) are electrically connected to the data driving circuit Data_driver 2, and receive the data signals provided by the data driving circuit Data_driver 2. After resetting the panel, a random scanning is implemented on each panel partition. In some exemplary embodiments, the scan line driving circuit Driver_T+B (which may correspond to any of the scan line driving circuits D1 to D3 in FIG. 1) includes multiple driver units, such as a first driver unit DU1 and a second driver unit DU2. The first driver unit DU1, for example, is electrically connected to the first part of the scan lines (for example, scan lines Scan_1 . . . Scan_M/2) in the corresponding panel, and a second driving unit DU2, for example, is electrically connected to the second part of the scan lines (for example, scan lines Scan_M/2+1 . . . Scan_M) in the corresponding panel. In some exemplary embodiments, the driver unit DU1 and the driver unit DU2 respectively provide start pulse vertical signals STV1 and STV2. For example, the first driver unit DU1 scans the scan lines Scan_1 . . . Scan_M/2 based on any of the jumping mode scanning procedures of FIG. 4A or FIG. 5A. For example, the second driver unit DU2 scans the scan lines Scan_(M/2)+1 . . . Scan_M based on any of the jumping mode scanning procedures of FIG. 4A or FIG. 5A, but it is not limited thereto. The first driver unit DU1 and the second driver unit DU2 may be selectively located on the same side or different sides (e.g., two sides opposite to each other) of the panel, but they are not limited thereto.

Figure 6B:
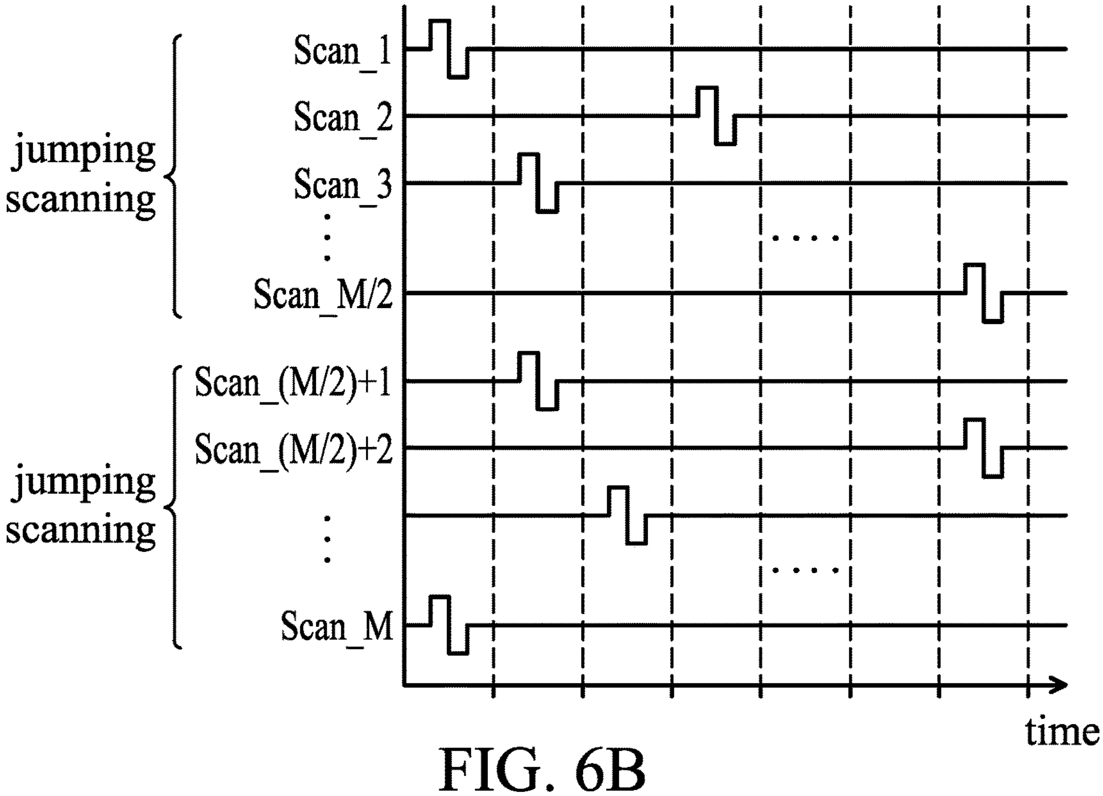

FIG. 6B is a timing diagram illustrating the scanning scheme of the panel of FIG. 6A, but this scanning scheme is only an example and can be modified, depending upon the specific requirements. The jumping mode scanning of the first part of the scan lines (Scan_1 . . . Scan_M/2) and the jumping mode scanning of the second part of the scan lines (Scan_(M/2)+1 . . . Scan_M) may be performed at the same time or separately. That is, the start pulse vertical signals STV1 and STV2 can be active at the same time or in different timings.

In some exemplary embodiments, referring to the scan lines numbered from top to bottom, the odd-numbered scan lines and the even-numbered scan lines can be controlled separately. When the odd-numbered scan lines, for example, are scanned from top to bottom, the even-numbered scan lines can be scanned from bottom to top, but it is not limited thereto. In an exemplary embodiment, when the even-numbered scan lines, for example, are scanned from top to bottom, the odd-numbered scan lines can be scanned from bottom to top.

Figure 7A:
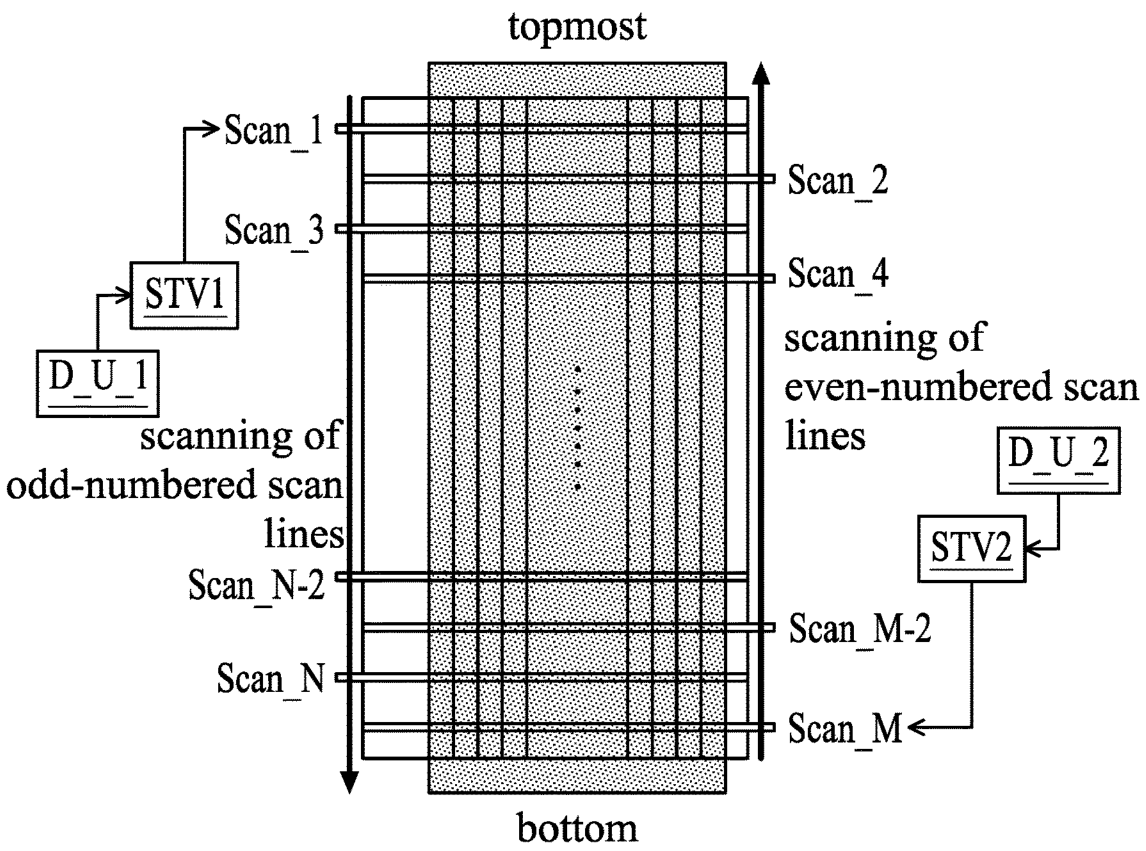
FIG. 7A illustrates a panel design of an electronic device in accordance with another exemplary embodiment of the disclosure.

FIG. 7A shows panel operations of another electronic device in accordance with another exemplary embodiment of the disclosure. The aforementioned panels P1, P2 or P3 may be operated in the illustrated way. The scan line driving circuit (which may correspond to any of the scan line driving circuits D1 to D3 of FIG. 1), for example, includes a plurality of driver units, including, for example, a first driver unit D_U_1 and a second driver unit D_U_2. The different driver units are, for example, electrically coupled to the different groups of the scan lines. For example, the odd-numbered scan lines are regarded as the first group of scan lines, and the even-numbered scan lines are regarded as the second group of scan lines. The first driver unit D_U_1 and the second driver unit D_U_2 are, for example, electrically connected to the first group of scan lines and the second group of scan lines, respectively. The first and second driver units D_U_1 and D_U_2 provide start pulse vertical signals STV1 and STV2 separately. In an exemplary embodiment but not limited thereto, the first driver unit D_U_1 is electrically connected to the first group of scan lines in the corresponding panel. The first group of scan lines is formed by odd-numbered scan lines which are numbered from top to bottom of the panel. The second driver unit D_U_2 is electrically connected to the second group of scan lines in the corresponding panel. The second group of scan lines is formed by even-numbered scan lines which are numbered from top to bottom of the panel. After the panel is reset, the first driver unit D_U_1, for example (but it is not limited thereto), scans the uppermost scan line Scan_1 of the panel with the start pulse vertical signal STV1, and the second driver unit D_U_2, for example (but it is not limited thereto), scans the lowermost scan line Scan_M of the panel with the start pulse vertical signal STV2 (M is an even number). The scan lines corresponding to the start pulse vertical signals STV1 and STV2 may be changed, depending upon the specific requirements. In some exemplary embodiments, the start pulse vertical signal STV1 is used to start scanning of odd-numbered scan lines from top to bottom, but it is not limited thereto. In some other exemplary embodiments, the start pulse vertical signal STV1 is used to start scanning of odd-numbered scan lines from bottom to top. The scanning order may have the other selections. In some exemplary embodiments, the start pulse vertical signal STV2 is used to start scanning of even-numbered scan lines from bottom to top, but it is not limited thereto. In some other exemplary embodiments, the start pulse vertical signal STV2 is used to start scanning of even-numbered scan lines from top to bottom. The scanning order may have the other selections. The jumping mode scanning of the first group of scan lines (odd-numbered scan lines) and the jumping mode scanning of the second group of scan lines (even-numbered scan lines) may be performed simultaneously or separately. That is, the start pulse vertical signals STV1 and STV2 may be active at the same time or at the different timings. In some exemplary embodiments, the different driver units (such as the first driver unit D_U_1 and the second driver unit D_U_2) may be placed at different sides of the panel, but they are not limited thereto.

Figure 7B:
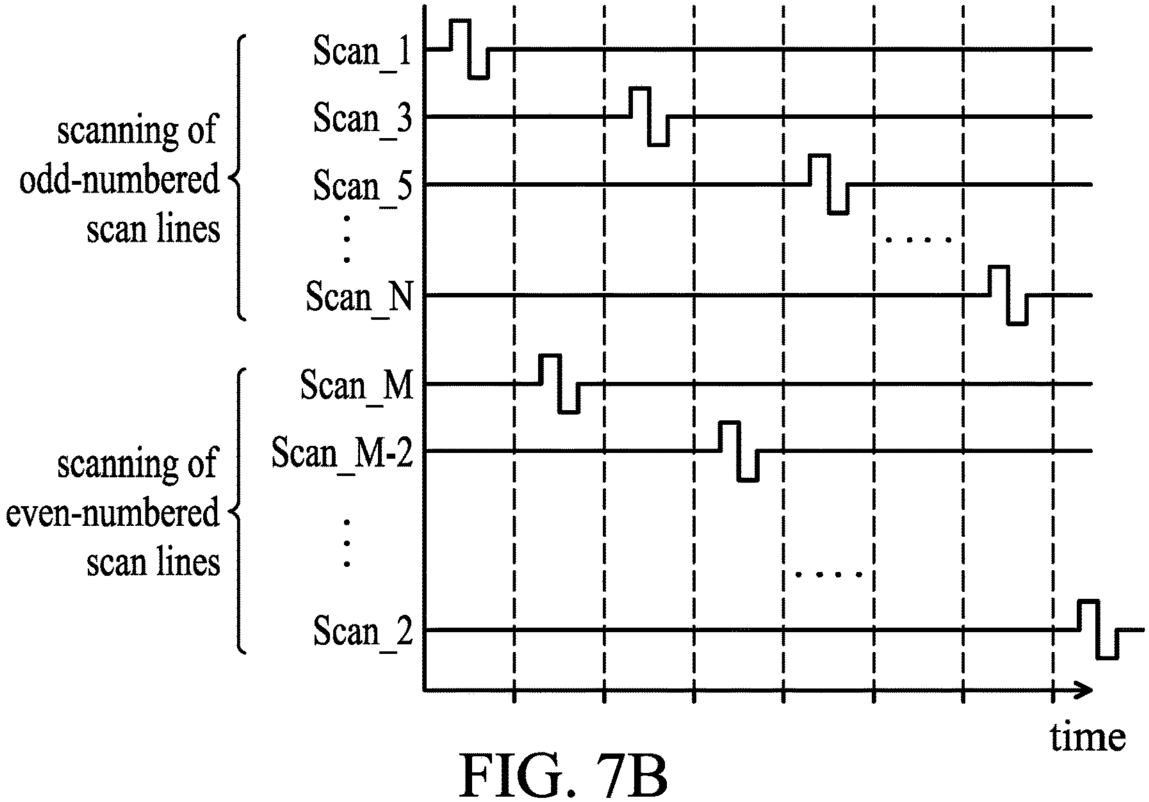
FIG. 7B are waveforms illustrating the scanning scheme of the panel depicted in FIG. 7A.

FIG. 7B is a timing diagram illustrating the scan timing of the panel of FIG. 7A. In this example, the scan order is: Scan_1→Scan_M→Scan_3→Scan_M−2→Scan_5→ . . . Scan_N Scan→Scan_2. Scan lines that are sequentially scanned in chronological order are not physically adjacent scan lines.

Figure 8:
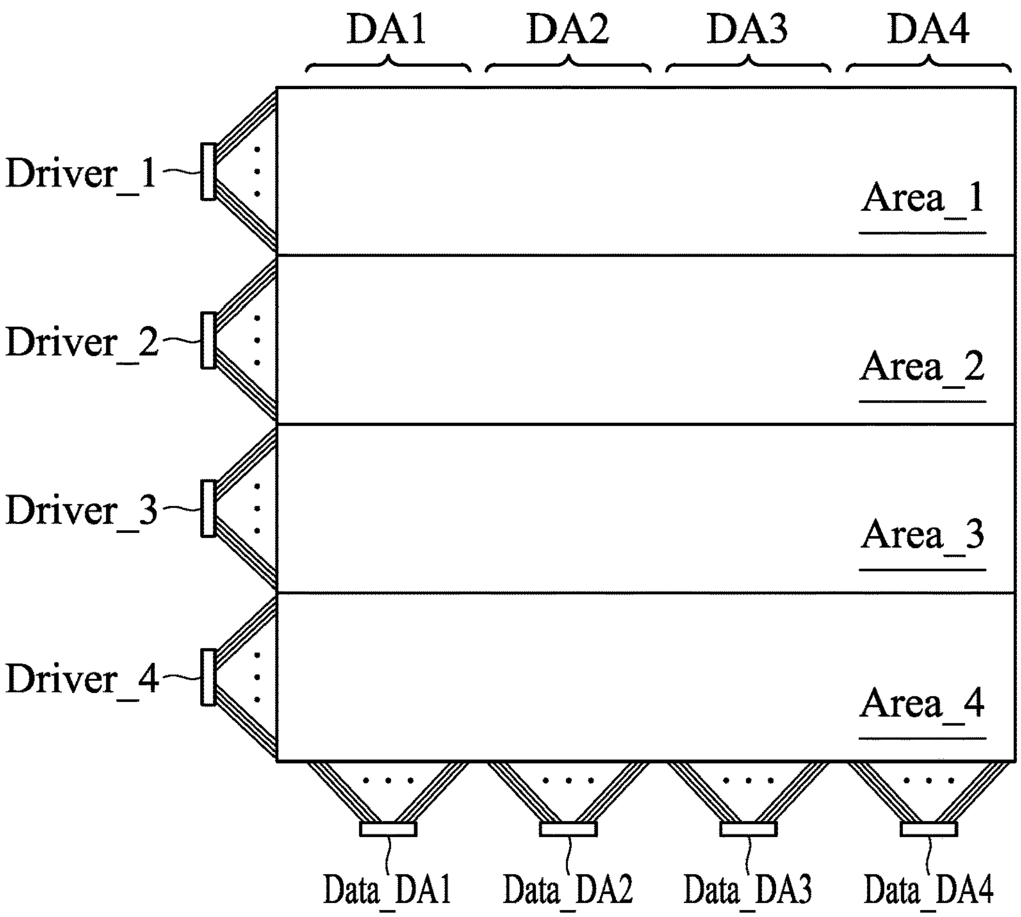
FIG. 8 shows an implementation of the electronic device.

FIG. 8 shows an implementation of the electronic device. The panel may include at least one scan area (as shown, the example includes scan area Area_1, scan area Area_2, scan area Area_3, and scan area Area_4). Scan lines in different scan areas, for example, are electrically connected to different scan line driving circuits (referring to the scan line driving circuit Driver_1, scan line driving circuit Driver_2, scan line driving circuit Driver_3, and scan line driving circuit Driver_4), but they are not limited thereto. The total number of scan areas may be the other number, depending upon the specific requirements.

The panel may include at least one data area (as shown, one panel is divided into data areas DA1, DA2, DA3, and DA4). Data lines in different data areas are, for example, electrically connected to different data input circuits (such as the data driving circuits Data_DA1, Data_DA2, Data_DA3, and Data_DA4), but they are not limited thereto. The number of scan areas depends on the designer's needs. The scan areas may be separately scanned according to any of the aforementioned scanning schemes (for example, any of the scanning schemes illustrated in FIG. 4A, FIG. 5A, FIG. 6A or FIG. 7A). That is, the scan line driving circuits Driver_1, Driver_2, Driver_3 and Driver_4 may separately operate according to any of the aforementioned scanning schemes (for example, any of the scanning schemes illustrated in FIG. 4A, FIG. 5A, FIG. 6A or FIG. 7A). In this manner, the scan lines sequentially scanned in chronological order are not physically adjacent scan lines. FIG. 8 illustrates one example of panel (e.g., panel P1), and the other panels (e.g., panel P2 or P3) may have similar implementations.

Figure 9A:
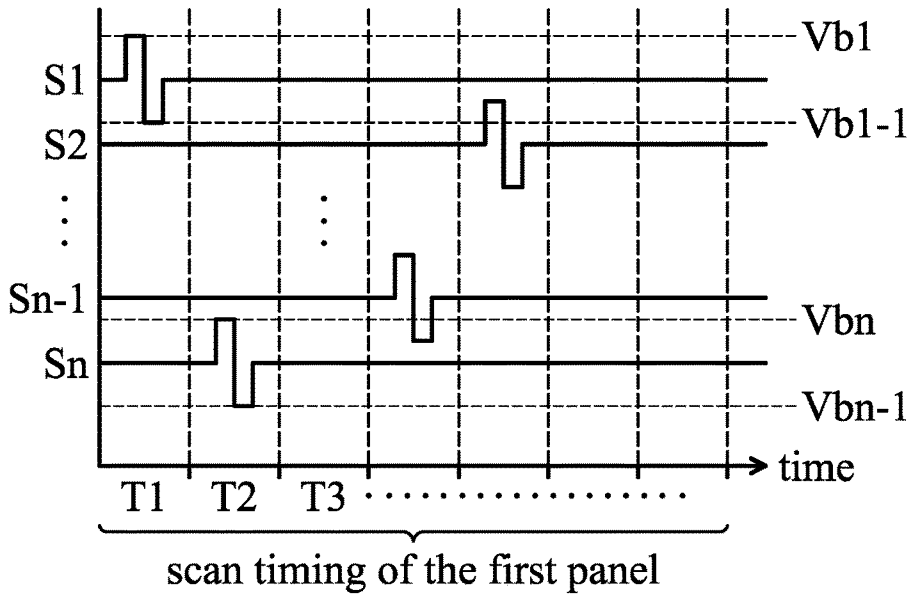
FIGS. 9A, 9B, and 9C respectively show the scan timing of the different panels.
Figure 9B:
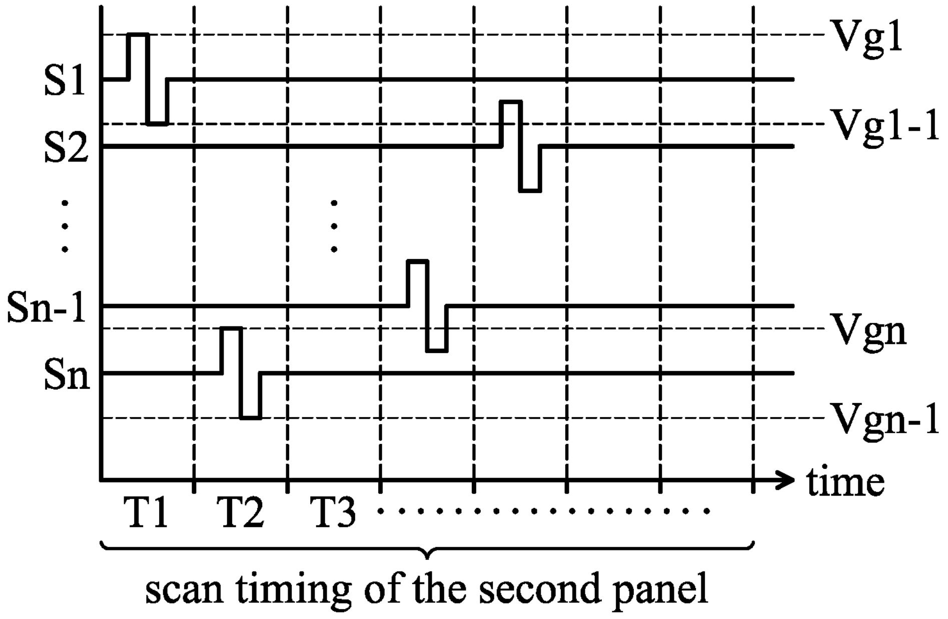
Figure 9C:
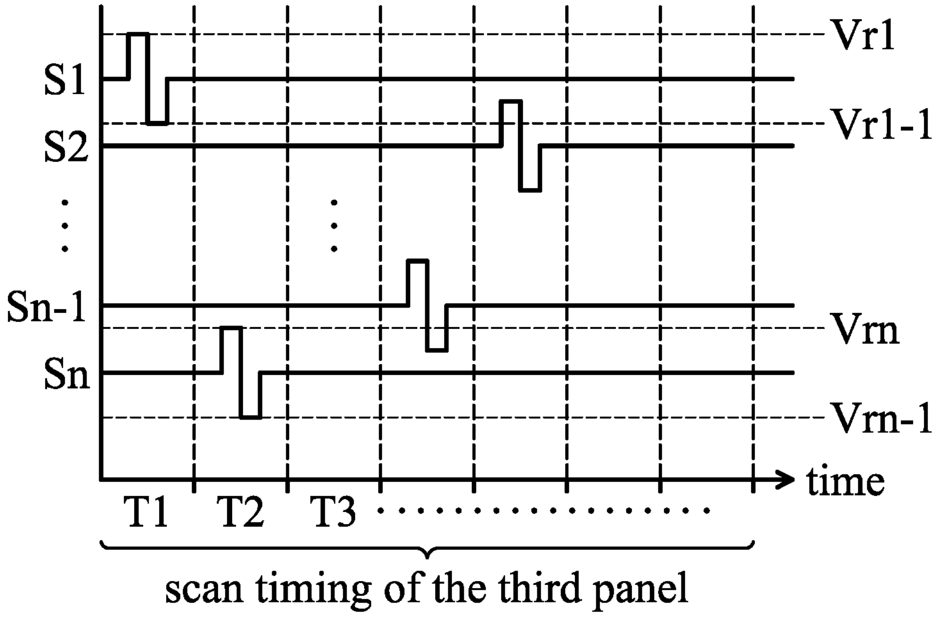

FIGS. 9A, 9B, and 9C respectively show the scan timing of the different panels (P1, P2, and P3). For example, the electronic device may include multiple panels, which may be panel P1, panel P2, and panel P3 respectively include cholesteric liquid crystals that reflect blue, green, and red. In the illustrated example (but not limited thereto), the different panels are scanned according to the same jumping mode scanning procedure with the synchronous scanning (referring to the time points T1, T2, T3, . . . ). For example, in terms of timing, the starting scan line of each panel is fixed (for example, all panels starts the scanning from its first row of scan line S1, but not limited to this), and then all panels scan the $n_{th}$ row of scan line Sn, and so on.

Referring to FIGS. 9A, 9B, and 9C, each scan line is activated when being driven by a pulse signal (such as S1 . . . Sn). In the illustrated exemplary embodiment, regarding the first panel (for example, a blue cholesteric liquid-crystal panel), the positive pulse Vb1 supplied to the topmost scan line (for example, the first scan line S1) may be the same as those supplied to the other scan lines (for example, the scan lines other than the first scan line S1). For example, the positive pulses supplied to the scan lines of the entire panel are the same, that is, Vb1= . . . =Vbn, but it is not limited to this. For example, the negative pulse Vb1−1 supplied to the topmost scan line (for example, the first scan line S1) of the first panel (for example, the blue cholesteric liquid-crystal panel) may be the same as those supplied to the other scan lines (for example, the scan lines other than the first scan line S1) of the first panel. For example, the negative pulses supplied to the scan lines of the entire panel are the same, that is, Vb1−1= . . . =Vbn−1, but it is not limited to this. In some exemplary embodiments, the absolute values of the positive pulse Vb1 and the negative pulse Vb1−1 may be the same or different, and the absolute values of the positive scan pulse value Vbn and the negative scan pulse value Vbn−1 may be the same or different. The second panel (for example, a green cholesteric liquid-crystal panel) and the third panel (for example, a red cholesteric liquid-crystal panel) can be designed similarly.

In the other exemplary embodiments (not shown), for example, the positive pulse Vb1 supplied to the uppermost scan line (such as the first scan line S1) of the first panel (such as a blue cholesteric liquid-crystal panel) may be different from at least one positive pulse supplied to the other scan lines (for example, the scan lines other than the first scan line S1) of the first panel. For example, the positive pulses supplied to the different scan lines of the same panel may be at least partially unequal, but they are not limited thereto. In the other embodiments (not shown), for example, the negative pulse Vb1−1 supplied to the uppermost scan line (such as the first scan line S1) of the first panel (such as a blue cholesteric liquid-crystal panel) may be different from at least one negative pulse supplied to the other scan lines (for example, the scan lines other than the first scan line S1) of the first panel. For example, the negative pulses supplied to the different scan lines of the same panel may be at least partially unequal, but they are not limited thereto. The second panel (for example, a green cholesteric liquid-crystal panel) and the third panel (for example, a red cholesteric liquid-crystal panel) can be designed similarly.

In some exemplary embodiments, the positive and negative pulses driving the scan lines of the different panels may be more flexible or completely unified. In an exemplary embodiment, the different color panels may all be scanned by identical positive pulses (Vb1= . . . =Vbn= Vg1= . . . =Vg1= . . . =Vgn=Vr1= . . . =Vrn) or identical negative pulses (Vb1−1= . . . =Vbn−1=Vg1−1= . . . = Vgn−1= . . . =Vgn−1=Vr1−1= . . . =Vrn−1) but it is not limited thereto. In some exemplary embodiments, the absolute values of the positive pulse Vb1 and the negative pulse Vb1−1 may be the same or different. The same principle may be applied to the other scan lines of the blue panel; referring to the bottom of the blue panel, the absolute values of the positive pulse Vbn and the negative pulse Vbn−1 may be the same or different. In some exemplary embodiments, the absolute values of the positive pulse Vg1 and the negative pulse Vg1−1 may be the same or different. The same principle may be applied to the other scan lines of the green panel; referring to the bottom of the green panel, the absolute values of the positive pulse Vgn and the negative pulse Vgn−1 may be same or different. In some exemplary embodiments, the absolute values of the positive pulse Vr1 and the negative pulse Vr1−1 may be the same or different. The same principle may be applied to the other scan lines of the red panel; referring to the bottom of the red panel, the absolute values of the positive pulse Vrn and the negative pulse Vrn−1 may be same or different.

The flexible design of the positive and negative pulses supplied to the scan lines helps with optimization of the image display.

Features in various embodiments may be combined as long as they do not violate or conflict the spirit of the invention. The spirit of this case is to make the scan lines scanned in chronological order being not physically adjacent to each other. All scanning schemes based on this concept are related to the spirit of the disclosure.

In an exemplary embodiment, to refresh an image, one of the scan line driving circuits sequentially scans a first-scanned scan line, a second-scanned scan line, and a third-scanned scan line of its corresponding panel in chronological order, wherein the second-scanned scan line is not physically adjacent to the first-scanned scan line, and is not physically adjacent to the third-scanned scan line. The number of scan lines spaced between the first-scanned scan line and the second-scanned scan line may be the same as the number of scan lines spaced between the second-scanned scan line and the third-scanned scan line.

In an exemplary embodiment, to refresh an image, one of the scan line driving circuits shown in FIG. 1 sequentially scans a first-scanned scan line, a second-scanned scan line, and a third-scanned scan line of its corresponding panel in chronological order, wherein the second-scanned scan line is not physically adjacent to at least one of the first-scanned scan line and the third-scanned scan line. The number of scan lines spaced between the first-scanned scan line and the second-scanned scan line may be different from the number of scan lines spaced between the second-scanned scan line and the third-scanned scan line.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An electronic device, comprising:

a display panel comprising a plurality of scan lines disposed from a top to a bottom, wherein the plurality of scan lines comprises odd-numbered scan lines and even-numbered scan lines by a physical position order;

a first driver unit electrically connected to the odd-numbered scan lines;

a second driver unit electrically connected to the even-numbered scan lines; and a controller, configured to control the first driver unit and the second driver unit, wherein prior to image refreshing, the controller is configured to control the first driver unit and the second driver unit to reset the display panel; and wherein when the controller performs image refreshing, during one image refreshing period, the controller is configured to scan the odd-numbered scan lines from the top to the bottom, and to scan the even-numbered scan lines from the bottom to the top.

2. The electronic device as claimed in claim 1, wherein:

the first driver unit and the second driver unit are respectively located at different sides of the display panel.

3. The electronic device as claimed in claim 1, further comprising:

a first data line driving circuit, electrically connected to electronic components being scanned by the odd-numbered scan lines; and a second data line driving circuit, electrically connected to electronic components being scanned by the even-numbered scan lines.

4. The electronic device as claimed in claim 1, wherein from the top to the bottom, the scan lines are numbered from 1 to M, M being an even number; and when the controller performs image refreshing, during one image refreshing period, the controller is configured to sequentially scan scan line number 1, scan line number M, scan line number 3, and scan line number (M−2).

5. The electronic device as claimed in claim 1, wherein from the top to the bottom, the scan lines are numbered from 1 to M, M being an even number; and when the controller performs image refreshing, during one image refreshing period, the controller is configured to:

simultaneously scan scan line number 1 and scan line number M;

simultaneously scan scan line number 3 and scan line number (M−2); and scan scan line number 1 and scan line number 3 at different times.

6. An electronic device, comprising:

a display panel comprising a plurality of scan lines disposed from a top to a bottom and numbered by a physical position order;

a scan line driving circuit, electrically connected to the plurality of scan lines; and a controller, configured to control the scan line driving circuit, wherein:

wherein prior to image refreshing, the controller controls the scan line driving circuit to reset the display panel;

wherein when the controller performs image refreshing, during one image refreshing period, the scan line driving circuit is configured to scan different scan lines of the plurality of scan lines at different times without time overlapping.

7. The electronic device as claimed in claim 6, wherein:

during one image refreshing period, the scan line driving circuit is configured to randomly scan the plurality of scan lines of the display panel.

8. The electronic device as claimed in claim 6, wherein:

during one image refreshing period, the scan line driving circuit is configured to scan the plurality of scan lines of the display panel by N rounds, where N is a positive integer greater than 1.

9. The electronic device as claimed in claim 8, wherein:

in each round, the scan line driving circuit is configured to sequentially scan a first scan line and a second scan line, and the first scan line and the second scan line are spaced between (N−1) scan lines by the physical position order.

10. The electronic device as claimed in claim 9, wherein in round i, with i being an integer from 1 to N, the scan line driving circuit is configured to start scanning from scan line number i.

* * * * *